United States Patent
Fukagawa et al.

(10) Patent No.: US 12,398,692 B2
(45) Date of Patent: Aug. 26, 2025

(54) AQUATIC WIND POWER GENERATION SYSTEM

(71) Applicant: TOYOTA JIDOSHA KABUSHIKI KAISHA, Toyota (JP)

(72) Inventors: Tateru Fukagawa, Fujisawa (JP); Hayato Masuki, Fuji (JP); Kazutaka Kimura, Mishima (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 18/439,868

(22) Filed: Feb. 13, 2024

(65) Prior Publication Data

US 2024/0337243 A1  Oct. 10, 2024

(30) Foreign Application Priority Data

Apr. 5, 2023 (JP) ................... 2023-061556

(51) Int. Cl.
| | | |
|---|---|---|
| *F03D 5/00* | (2006.01) | |
| *B63B 35/44* | (2006.01) | |
| *B63H 25/04* | (2006.01) | |
| *F03D 13/25* | (2016.01) | |

(52) U.S. Cl.
CPC .............. *F03D 5/015* (2023.08); *B63B 35/44* (2013.01); *B63H 25/04* (2013.01); *F03D 13/256* (2023.08); *B63B 2035/446* (2013.01); *F05B 2240/9176* (2020.08)

(58) Field of Classification Search
CPC .......... F03D 5/015; F03D 13/256; F03D 5/00; F03D 9/32; B63B 35/44; B63B 2035/446; B63H 25/04; B63H 9/00; F05B 2240/9176

See application file for complete search history.

(56) References Cited

U.S. PATENT DOCUMENTS

| | | |
|---|---|---|
| 9,416,770 B2 | 8/2016 | Paulig et al. |
| 2008/0210826 A1 | 9/2008 | Ockels et al. |
| 2011/0272527 A1 | 11/2011 | Larson |
| 2022/0389904 A1* | 12/2022 | Reiners .................... F03D 5/06 |

FOREIGN PATENT DOCUMENTS

| | | |
|---|---|---|
| CN | 211116407 U | 7/2020 |
| JP | 2014-184936 A | 10/2014 |
| WO | 2021/094987 A1 | 5/2021 |

* cited by examiner

*Primary Examiner* — Joseph Ortega
(74) *Attorney, Agent, or Firm* — Oliff PLC

(57) ABSTRACT

An aquatic wind power generation system includes: a hull that navigates on water; a power generation system that includes a kite connected to the hull via a tether, and repeats between a power generation mode, in which wind power is generated by an unwinding operation of the tether due to flight of the kite, and retraction mode, in which the tether is retracted by a winding operation of the tether; and a controller that performs control to direct a bow of the hull in a leeward direction in the retraction mode.

1 Claim, 6 Drawing Sheets

AQUATIC WIND POWER GENERATION SYSTEM

CROSS-REFERENCE TO RELATED APPLICATION

This application claims priority to Japanese Patent Application No. 2023-061556 filed on Apr. 5, 2023, incorporated herein by reference in its entirety.

BACKGROUND

1. Technical Field

The disclosure relates to an aquatic wind power generation system.

2. Description of Related Art

WO2021/094987 discloses a marine wind power generation system that generates wind power by flying a kite using an engine from a floating structure on the sea, such as a hull equipped with a propulsion device. The marine wind power generation system alternates between a power generation mode, in which wind power is generated by unwinding a tether connected to a kite, and a retraction mode, in which the tether is retracted by winding the tether.

SUMMARY

In the above marine wind power generation system that alternates between the power generation mode and the retraction mode, when the kite is retracted against the wind direction during the retraction mode, the energy required to wind the tether increases. This leads to decreased cost efficiency, indicating room for improvement.

Considering the above facts, it is an object of the disclosure to provide an aquatic wind power generation system capable of improving the overall power generation efficiency.

An aquatic wind power generation system according to a first aspect of the disclosure includes: a hull that navigates on water; a power generation system that includes a kite connected to the hull via a tether, and alternates between a power generation mode, in which wind power is generated by the unwinding operation of the tether due to the flight of the kite, and a retraction mode, in which the tether is retracted by the winding operation of the tether, and a controller that performs control to direct the bow of the hull in a leeward direction in the retraction mode.

The aquatic wind power generation system according to the first aspect of the disclosure alternates between the power generation mode, in which wind power is generated by the unwinding operation of the tether due to the flight of the kite, and a retraction mode, in which the tether is retracted by the winding operation of the tether, and performs control to direct the bow of the hull in the leeward direction in the retraction mode. Thus, the bow of the hull faces the leeward direction when the tether is retracted, and hence the relative wind velocity with respect to the kite can be reduced. This allows for a reduction in the energy consumption required for the winding operation of the tether, thereby improving the overall power generation efficiency.

In an aquatic wind power generation system according to a second aspect of the disclosure, in the configuration according to the first aspect, in the retraction mode, when the advancing direction of the hull is angled with respect to the wind direction of natural wind, the controller controls the advancing velocity of the hull so that a relative velocity with respect to the hull is orthogonal to the advancing velocity of the hull, the relative velocity being a composite velocity of the advancing velocity of the hull and a wind velocity of the natural wind. Note that the term "orthogonal" here includes a slight allowable range in addition to being completely orthogonal.

In the aquatic wind power generation system according to the second aspect of the disclosure, when the advancing direction of the hull is angled with respect to the wind direction of the natural wind, the advancing velocity of the hull is controlled so that the relative velocity with respect to the hull is orthogonal to the advancing velocity of the hull, thus enabling the relative velocity with respect to the hull to reach the minimum velocity. Therefore, by the relative velocity with respect to the hull reaching the minimum velocity, the relative wind velocity with respect to the kite can be minimized, and the energy consumption required for the winding operation of the tether can also be minimized. Accordingly, it is possible to further improve the overall power generation efficiency.

In an aquatic wind power generation system according to a third aspect of the disclosure, in the configuration according to the first aspect, in the retraction mode, the controller controls the direction of the bow so that the vector direction of the tension of the kite matches an advancing direction of the hull when viewed from above the hull. Note that the term "match" here includes a slight allowable range in addition to a perfect match.

In the aquatic wind power generation system according to the third aspect of the disclosure, when the tether is retracted, the hull advances in the vector direction of the tension of the kite, and hence the relative wind velocity with respect to the kite can be efficiently reduced. This also allows for an efficient reduction in the energy consumption required for the winding operation of the tether, thereby efficiently improving the overall power generation efficiency.

In an aquatic wind power generation system according to a fourth aspect of the disclosure, in the configuration according to any one of the first to third aspects, in the power generation mode, the controller performs control to direct the bow of the hull to the windward direction.

In the aquatic wind power generation system according to the fourth aspect of the disclosure, when wind power is generated by the kite, since the bow of the hull faces the windward direction, the hull moves against the natural wind. This allows for an increase in the relative wind velocity with respect to the kite, leading to a faster unwinding speed of the tether and thus an increase in power output.

In an aquatic wind power generation system according to a fifth aspect of the disclosure, in the configuration according to the fourth aspect, in the power generation mode, the controller controls the direction of the bow so that the wind direction of natural wind and an advancing direction of the hull are orthogonal to each other when viewed from above the hull. Note that the term "orthogonal" here includes a slight allowable range in addition to being completely orthogonal.

In the aquatic wind power generation system according to the fifth aspect of the disclosure, by making the advancing direction of the hull orthogonal to the wind direction of the natural wind, the advancing direction of the hull can be set to a direction abeam to the wind, resulting in a faster advancing velocity of the hull. This increases the propulsive force of the hull, thereby increasing the lateral force applied to the hull and enabling a reduction in the tension of the kite. Therefore, it is possible to efficiently increase the relative velocity with respect to the kite, leading to a faster unwinding speed of the tether and thus an increase in power output.

As described above, the aquatic wind power generation system according to the disclosure has an excellent effect in enabling an improvement in overall power generation efficiency.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
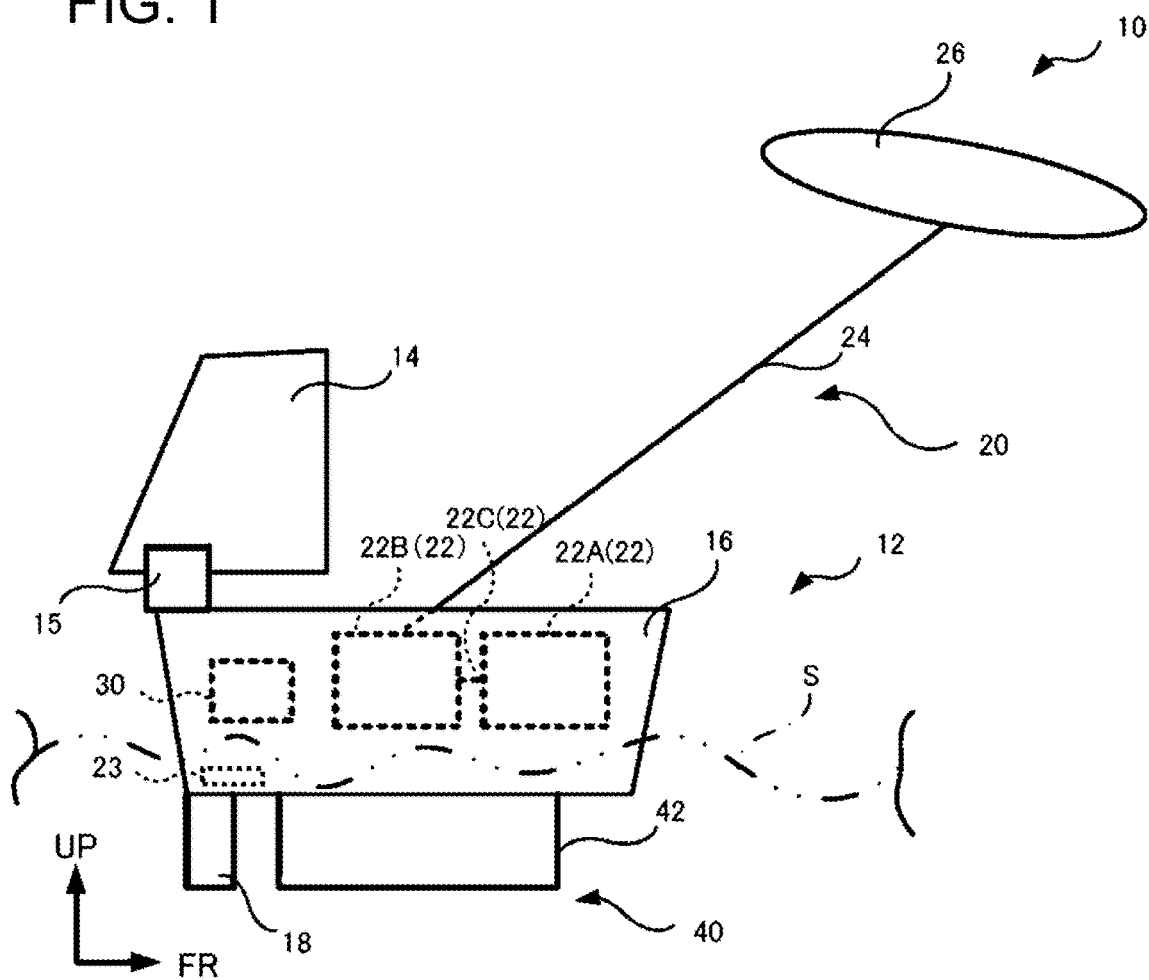
FIG. 1 is a schematic configuration diagram schematically illustrating a configuration of an aquatic wind power generation system according to a first embodiment of the disclosure.

An aquatic wind power generation system 10 according to an embodiment of the disclosure will be described below with reference to FIGS. 1 to 13. An arrow UP and an arrow FR, shown as appropriate in the drawings, indicate the upper side of a hull-height direction and the front of a hull front-rear direction, respectively. An arrow W indicates a hull-width direction. In the drawings, only some of the reference numerals are shown and the others are omitted to prioritize the clarity of the drawings.

As illustrated in FIG. 1, an aquatic wind power generation system 10 is equipped with: a sailboat 12 including a hull 16 that is operated on a sea, lake, river, or the like; a power generation system 20 that generates electric power; and a control device 30 that controls the steering of the sailboat 12, the drive of the power generation system 20, and the like. Although not illustrated, the control device 30 serving as a controller includes various electric devices (electric components), a control unit, and the like. The control unit includes a central processing unit (CPU: processor), a read-only memory (ROM), a random-access memory (RAM), a storage device, a communication interface (communication I/F), and an input-output interface (input-output I/F). A generator 22A and the like, which will be described later, are connected to the input-output I/F.

Configuration of Power Generation System 20

The power generation system 20 includes, for example, a power generation device 22 disposed on the hull 16, and a kite 26 connected to the hull 16 via a tether 24. The kite 26 is composed of a kite body and is moored on the hull 16 by a tether 24.

The power generation device 22 includes a generator 22A and a winch 22B. To the rotating shaft of the generator 22A, a rotating shaft body 22C is connected, and the generator 22A rotates the rotating shaft body 22C based on a command from the control device 30. The winch 22B has the rotating shaft body 22C as its rotating shaft, and the tether 24 is wound around the rotating shaft body 22C. In the power generation device 22, the rotating shaft body 22C is rotated clockwise or counterclockwise to unwind the tether 24 from the winch 22B or wind the tether 24 onto the winch 22B.

In the power generation system 20, in a case where the kite 26 ascends, the tether 24 is unwound from the winch 22B as the kite 26 ascends. The rotating shaft body 22C is rotated by the unwinding operation of the tether 24, and the rotating shaft of the generator 22A is rotated in conjunction with the rotation of the rotating shaft body 22C, thereby generating electric power. A power output Q due to the rise of the kite 26 is a value obtained by multiplying the tension of the tether 24 by the unwinding speed of the tether 24.

After the tether 24 is unwound to a predetermined length or after a predetermined time has elapsed, the rotating shaft body 22C is rotated in the opposite direction, that is, in the direction to wind the tether 24, by a motor 23, for example, via the generator 22A based on a command from the control device 30. Thereby, the tether 24 is wound, and the kite 26 thus descends.

Figure 2:
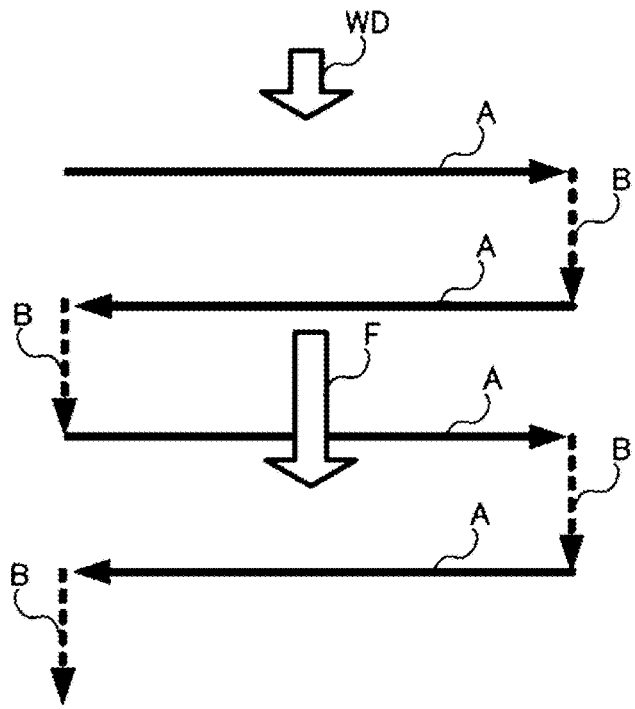
FIG. 2 is a route chart illustrating a movement trajectory of a hull when the hull moves leeward.

As illustrated in FIG. 2, the power generation system 20 alternates and repeats between a power generation mode A, in which wind power is generated by the unwinding operation of the tether 24 due to the flight of the kite 26, and a retraction mode B, in which the tether 24 is retracted by the winding operation of the tether 24. In the present embodiment, in the power generation system 20, the time required for the power generation mode A is set to be longer than the time required for the retraction mode B. Further, the power output Q in the power generation mode A is set to be larger than the amount of electric power consumed by the retraction mode B. As illustrated in FIG. 2, in the power generation system 20, the wind power generation in the power generation mode A and the retraction of the tether 24 in the retraction mode B are performed while the sailboat 12 is caused to execute movement F to increase the power generation efficiency. Note that the movement F will be described in detail later.

Configuration of Sailboat 12

As illustrated in FIG. 1, the sailboat 12 includes the hull 16 equipped with the sail 14. The hull 16 is a body of a floating structure configured to float on a water surface S of the sea, lake, river, or the like, and generates buoyancy, which is an upward force equal to the weight of the water displaced by the bottom of the hull 16 positioned in the water. The hull 16 includes a rudder 18 serving as a steering device. The hull 16 also includes, at the its bottom positioned below the water surface S, a lateral force generating portion 40 that generates a lateral force, which will be described later.

The sail 14 is made of a membrane material, and is composed of a soft sail formed using an elastic material that inflates with wind. In the present embodiment, the sail 14 has been composed of a soft sail as an example, but the disclosure is not limited thereto, and may be composed of a hard sail formed using a hard material with an airfoil shape, for example. The number of sails 14 is not limited to one, and a plurality of sails 14 may be provided.

The sail 14 is fixed to the hull 16 via a mast 15, and the base portion of the mast 15 is made rotatable with respect to the hull 16. By rotating the base portion of the mast 15 with respect to the hull 16, a sail angle as to be described later can be set to any angle. The mast 15 is driven and controlled by the control device 30 described above. When the mast 15 is configured for manual operation, the control device 30 informs a user of the required amount of rotation or the like to set the sail angle as to the desired angle, and the like, using informing means (not illustrated) such as a display or a vocal sound. In the present embodiment, as an example, the sail angle as is changed by rotating the base portion of the mast 15 with respect to the hull 16. However, the disclosure is not limited thereto, and the manner of changing the sail angle as can be varied as appropriate.

As illustrated in FIG. 1, the rudder 18 has a flat surface and is provided on the rear side of the bottom surface of the hull 16 to control the direction of a bow 16A of the hull 16. Specifically, the rudder 18 is configured to be rotatable, and rotates to change the direction of the flow in the water, and the direction of the bow 16A changes due to the change in the flow in the water. The rudder 18 is drive-controlled by the control device 30 described above. When the rudder 18 is configured for manual operation, the control device 30 informs of the required amount of movement to move the bow 16A of the hull 16 in the desired direction, and the like, using the informing means (not illustrated).

Note that the method for controlling the direction of the bow 16A of the hull 16 is not limited to using the rudder 18, and it is possible to use a known technique such as a thruster (propulsion device) that generates a moment in the direction of the bow 16A.

As illustrated in FIG. 1, the lateral force generating portion 40 is provided on the bottom surface of the hull 16. In the present embodiment, the lateral force generating portion 40 includes a board 42 as a plate material fixed to extend in the front-rear direction at the center of the width of the hull 16. The board 42 generates a lateral force Fb to be described later in a direction substantially orthogonal to the advancing direction of the hull 16.

As described above, in the power generation system 20, the wind power generation in the power generation mode A and the retraction of the tether 24 in the retraction mode B are performed while the sailboat 12 is caused to execute the movement F to increase the power generation efficiency.

Leeward Movement Pattern

Here, a leeward movement pattern will be described, where electric power is generated while the sailboat 12 as a whole is caused to execute the movement F in the leeward direction. As illustrated in FIG. 2, in the power generation mode A, the control device 30 moves the hull 16 in a direction that crosses a wind direction WD of the natural wind, that is, a direction abeam to the wind, and in the retraction mode B, the control device 30 moves the hull 16 in a direction substantially the same as the wind direction WD.

Power Generation Mode A

Figure 3:
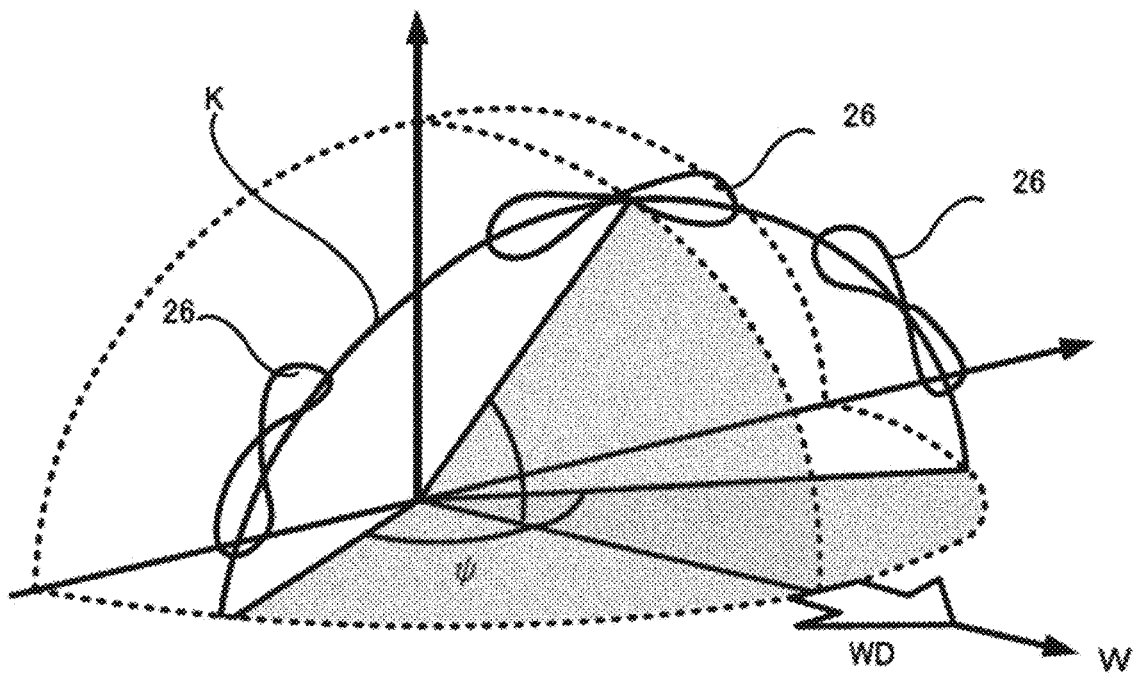
FIG. 3 is a diagram illustrating in three dimensions a line of maximum flight range within which the kite can fly.

Generally, the kite 26 has its flyable range for generating electric power. As illustrated in FIG. 3, in the present embodiment, the flyable range is represented by an angle ψ formed between a wind axis W and the tether 24 (cf. FIGS. 1 and 4). The angle ψ is an angle with respect to the average position of the tether 24 during the flight of the kite 26 in the wind power generation mode A. In FIG. 3, an arc denoted by K indicates a flight trajectory of the kite 26, and a range shown in color indicates the flyable range. Note that the flyable range, that is, the value of the angle ψ, depends on the inherent performance of the kite 26.

Figure 4:
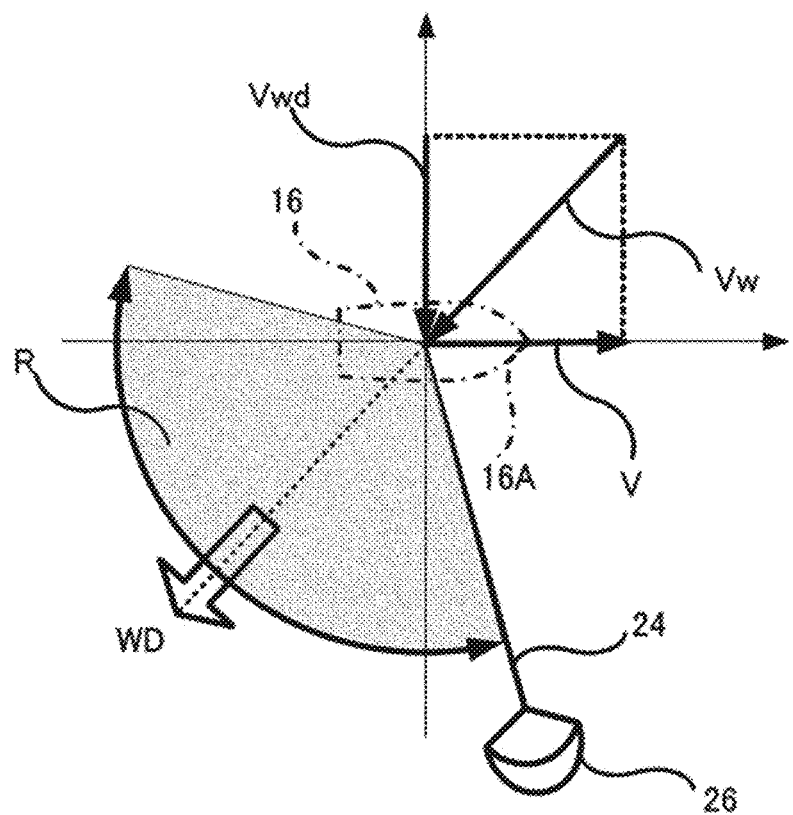
FIG. 4 is a diagram illustrating in two dimensions a line of maximum flight range within which the kite can fly.

As illustrated in FIG. 4, when the flyable range shown in color in FIG. 3 is projected onto an azimuth plane, the maximum flight azimuth is the azimuth at which the kite 26 can be caused to fly closest to the direction of the bow 16A of the hull 16, that is, the azimuth at the position of the tether 24 illustrated in FIG. 4. In the present embodiment, in the power generation mode A, the control device 30 maintains the position of the kite 26 so that the tether 24 is positioned in the maximum flight azimuth direction. However, the control device 30 causes the kite 26 to fly with a margin within the flyable range because the kite 26 may unintentionally be positioned outside the flyable range. That is, the control device 30 causes the kite 26 to fly in such a manner that the tether 24 is positioned slightly inward of the maximum flight azimuth direction within the flyable range.

Movement Direction of Hull 16

Figure 5:
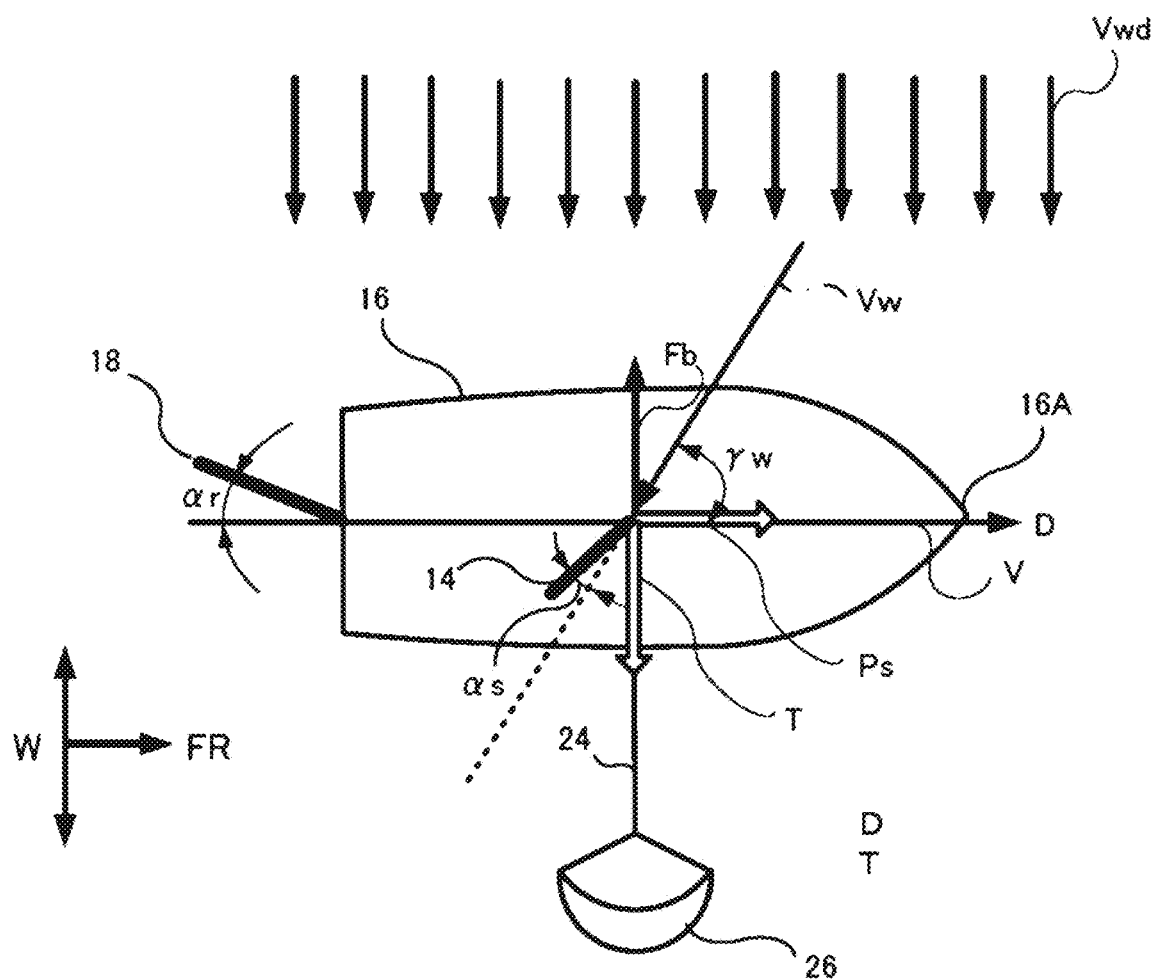
FIG. 5 is a plan view illustrating the relationship between a wind direction and a force applied to a hull in a power generation mode.
Figure 6:
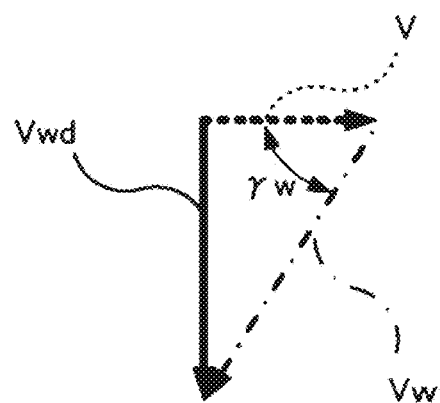
FIG. 6 is a diagram illustrating the relationship among a relative wind velocity with respect to the hull, an advancing velocity, and a wind velocity.

As illustrated in FIG. 5, in the power generation mode A, the sail 14 generates propulsive force by utilizing the wind force of the natural wind. In FIGS. 5 and 6, the direction of the vector represents the wind direction, and the magnitude of the vector represents the velocity. As illustrated in FIG. 6, a relative velocity Vw with respect to the hull 16, indicated by the single-dotted line, is expressed as a composite velocity of a wind velocity Vwd of the natural wind, indicated by the solid line, and an advancing velocity V of the hull 16, indicated by the dotted line. The relative velocity Vw is detected by a wind direction and velocity sensor (not illustrated) mounted on the hull 16. Specifically, the wind direction and velocity sensor detects a relative angle γw, which is the wind direction relative to the hull 16, and the relative velocity Vw.

As illustrated in FIG. 5, a propulsive force Ps due to the sail 14 changes with a change in the sail angle αs, which is an angle of attack between the sail 14 and the relative velocity Vw. The propulsive force Ps increases as the sail angle αs increases, and the movement velocity of the sailboat 12 increases as the propulsive force Ps increases.

Further, the lateral force Fb is generated on the hull 16 by the board 42 in a direction substantially orthogonal to the advancing direction of the hull 16. The control device 30 generates the lateral force Fb in a direction to cancel tension T caused by the kite 26. In the present embodiment, as an example, the control device 30 changes a rudder angle αr so that the lateral force Fb acts in a direction opposite to the tension T caused by the kite 26. Note that the means for generating the lateral force Fb is not limited thereto, and for example, a known technique such as making the board 42 movable can be used.

The lateral force Fb generated by the board 42 increases as the movement velocity of the hull 16 increases. In other words, the lateral force Fb increases as the propulsive force Ps increases. In the present embodiment, the control device 30 controls the sail angle αs to maximize the propulsive force Ps. Here, the sail angle αs at which the maximum propulsive force Ps can be obtained will be described.

Figure 7:
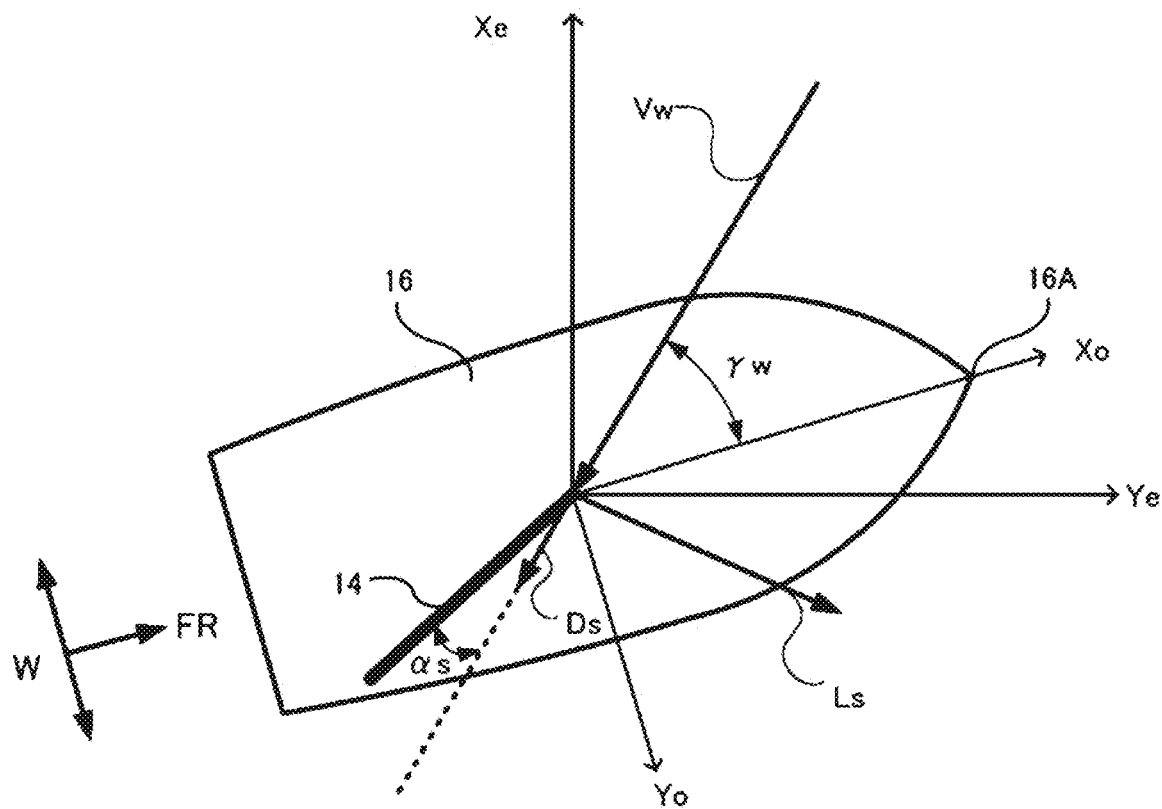
FIG. 7 is a plan view illustrating in coordinates the relationship between the relative wind velocity and a propulsive force with respect to a sail angle.

When the coordinates are defined as illustrated in FIG. 7, a lift force Ls and a drag force Ds change with a change in the sail angle αs, which is an angle of attack between the sail 14 and the relative velocity Vw. The lift force Ls is generated in a direction orthogonal to the relative velocity Vw, and the drag force Ds is generated in the same direction as the relative velocity Vw. Here, the values of the lift force Ls and the drag force Ds with respect to the sail angle αs are inherent characteristics of each sailboat 12. Accordingly, the values of the lift force Ls and the drag force Ds with respect to the sail angle αs are obtained in advance through wind tunnel tests and computational fluid dynamics (CFD) for fluid analysis.

Figure 8:
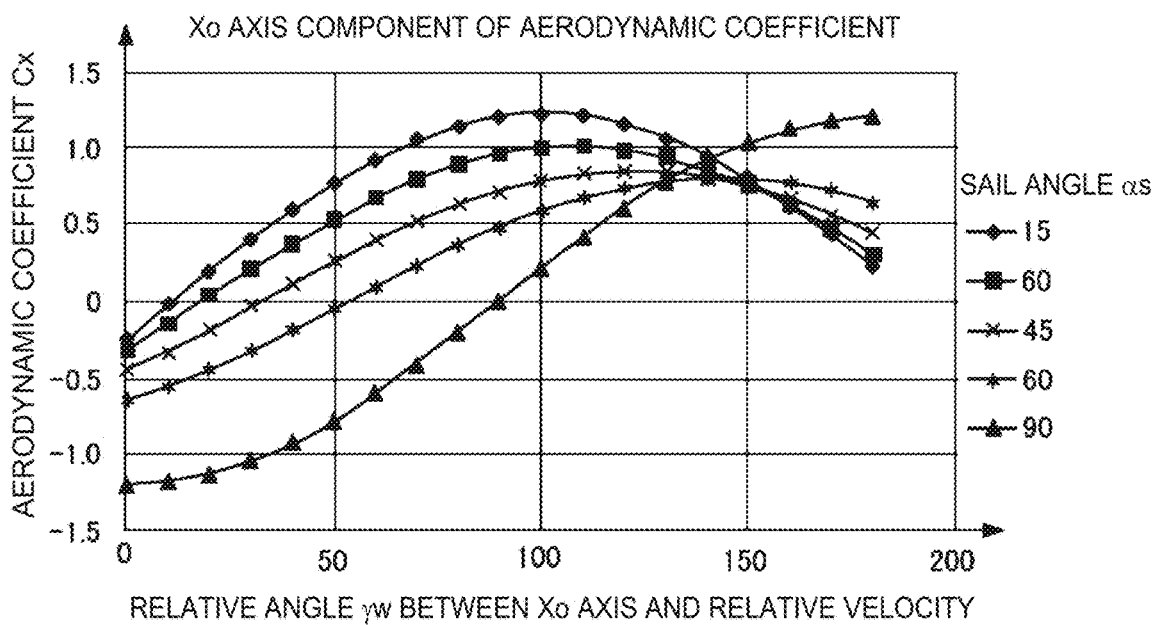
FIG. 8 is a graph illustrating the relationship between a relative angle between an Xo axis and the relative wind velocity, and an aerodynamic coefficient for each sail angle.

The propulsive force Ps with respect to the relative angle γw of an Xo axis and the relative velocity Vw is illustrated in the graph of FIG. 8 for each sail angle αs. In FIG. 8, an aerodynamic coefficient Cx is a dimensionless coefficient of the propulsive force Ps in the Xo axis direction of the hull 16. As illustrated in FIG. 8, in a case where the relative angle γw is 140° or less, the propulsive force Ps reaches its maximum when the sail angle αs, at which the lift force Ls is at its maximum, is 15°. In a case where the relative angle γw exceeds 140°, the propulsive force Ps reaches its maximum when the sail angle αs, at which the drag force Ds is at its maximum, is 90°. Note that the threshold value of 140° for the relative angle γw and the maximum sail angle αs may vary depending on the shape of the sail 14, but generally become values around the values described above.

Retraction Mode B
Movement Direction of Hull 16

Figure 9:
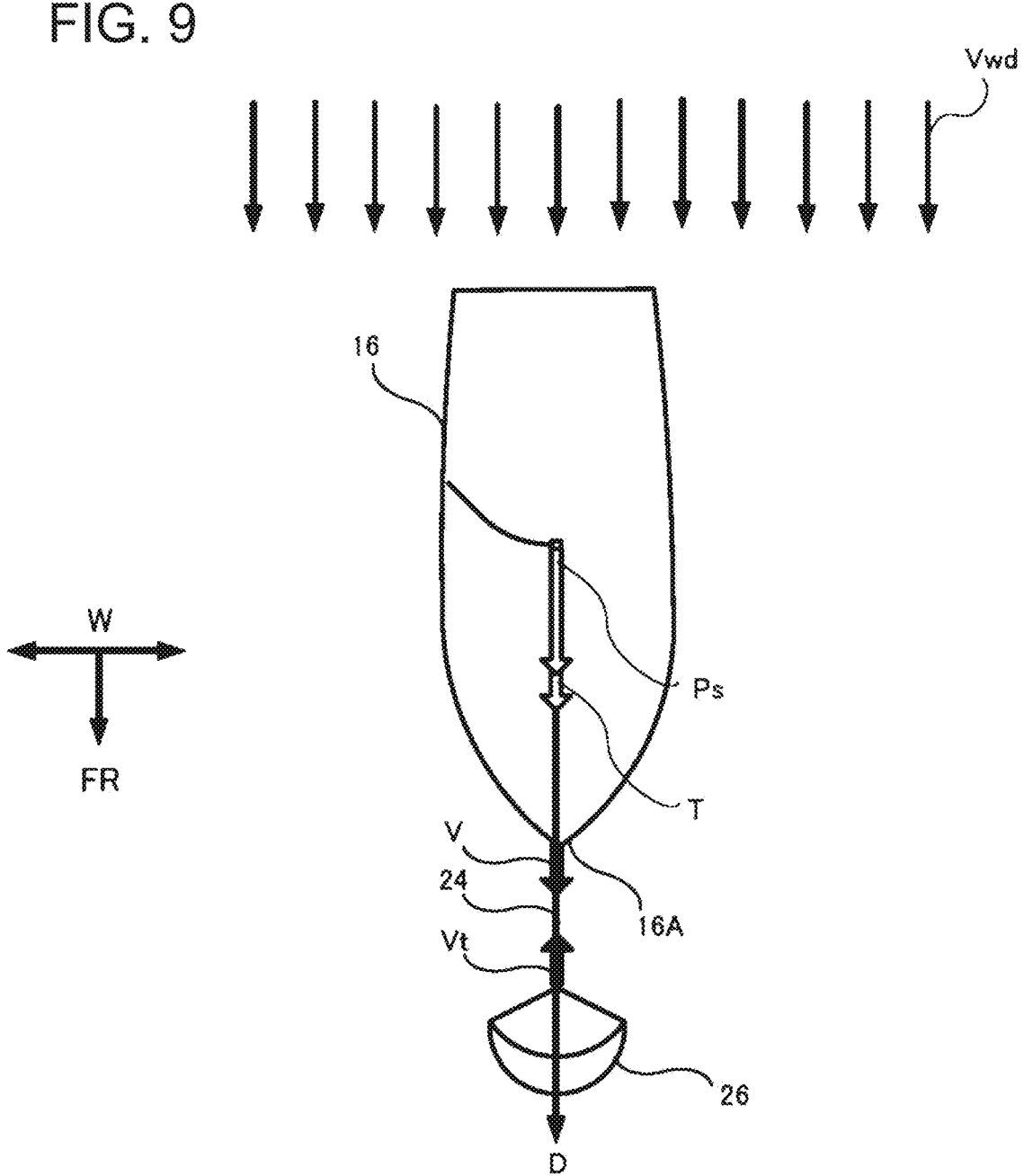
FIG. 9 is a plan view illustrating the relationship between the wind direction and the force applied to the hull in a retraction mode.

As illustrated in FIGS. 2 and 9, in the retraction mode B, the hull 16 is moved in a direction substantially the same as the wind direction WD. Specifically, the control device 30 performs control to direct the bow 16A of the hull 16 in the leeward direction by rotating the rudder 18 to change the rudder angle αr.

As illustrated in FIG. 9, in the present embodiment, since an advancing direction D of the hull 16 is a direction substantially the same as the wind velocity Vwd direction of the natural wind, the vector direction of the advancing velocity V of the hull 16 is also a direction substantially the same as the wind velocity Vwd direction. When the wind velocity Vwd is constant, the relative velocity Vw of the hull 16 is changed according to the advancing velocity V. That is, as the advancing velocity V increases, the relative velocity Vw decreases, and hence the control device 30 controls the sail angle αs so that the propulsive force Ps becomes smaller. Specifically, since the relative angle γw is 180°, the control device 30 controls the sail angle αs so that the sail angle αs is 90° with reference to the graph of FIG. 8.

As illustrated in FIG. 9, the control device 30 causes the kite 26 to fly so that the tether 24 is in a direction substantially the same as the wind velocity Vwd direction when viewed from above the hull 16. Note that the control device 30 winds the tether 24 at an appropriate winding speed Vt that maximizes the average power output.

Figure 10:
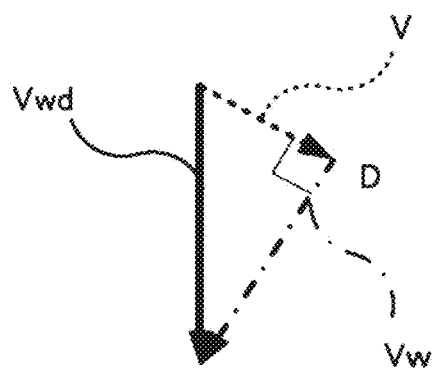
FIG. 10 is a diagram illustrating the relationship among the relative wind velocity with respect to the hull, the advancing velocity, and the wind velocity.

In the above leeward movement pattern, the movement direction has been set as described above because the advancing direction D of the hull 16 is the same direction as the wind velocity Vwd direction of the natural wind. However, as illustrated in FIG. 10, in a case where the advancing direction D of the hull 16 is angled with respect to the wind velocity Vwd of the natural wind, there exists an advancing velocity V of the hull 16 that minimizes the relative velocity Vw of the hull 16 when the hull 16 is navigated in the leeward direction. This is a case specifically when the vector of the advancing velocity V of the hull 16 and the vector of the relative velocity Vw are orthogonal to each other. Next, the movement pattern of the hull 16 when the advancing direction D of the hull 16 is angled with respect to the wind velocity Vwd of the natural wind will be described.

In the following pattern, in both the power generation mode A and the retraction mode B, the azimuth and the sail angle αs of the tether 24 of the kite 26 are the same as those in the leeward movement pattern described above. The azimuth for the advancement of the hull 16 in the windward or leeward direction is determined in view of the need for the movement, considering the maximum wind velocity of the natural wind with respect to the azimuth and the performance such as the power output.

Position Maintaining Movement Pattern

Figure 11:
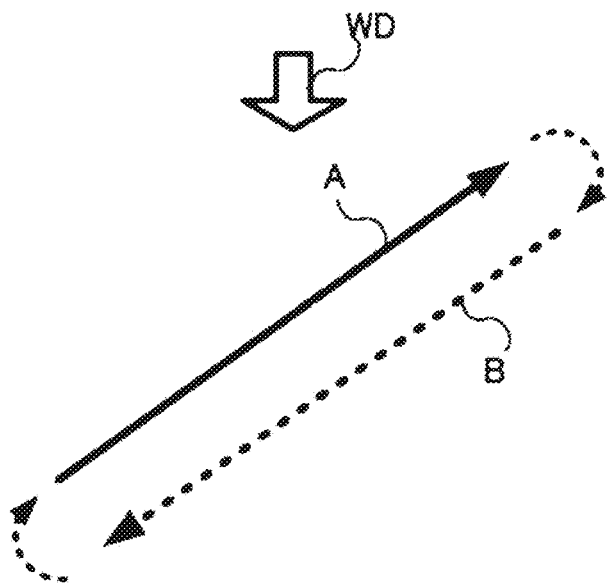
FIG. 11 is a route chart illustrating a movement trajectory of the hull when the hull moves while maintaining its position.

As illustrated in FIG. 11, when wind power generation is conducted while the hull 16 stays within a predetermined range, the advancing direction of the hull 16 in the power generation mode A is opposite to the advancing direction of the hull 16 in the retraction mode B.

Windward Movement Pattern

Figure 12:
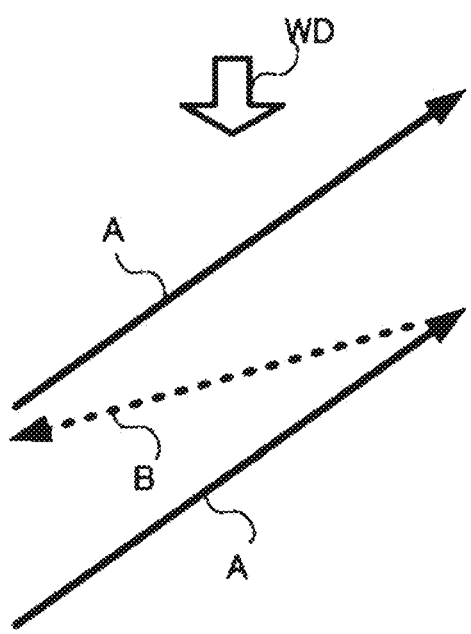
FIG. 12 is a route chart illustrating a movement trajectory of the hull when the hull moves windward.

As illustrated in FIG. 12, when wind power generation is conducted while the hull 16 as a whole moves in the leeward direction, the hull 16 is moved so that the amount of movement of the hull 16 in the windward direction in the power generation mode A exceeds the amount of movement of the hull 16 in the leeward direction in the retraction mode B.

Horizontal Movement Pattern

Figure 13:
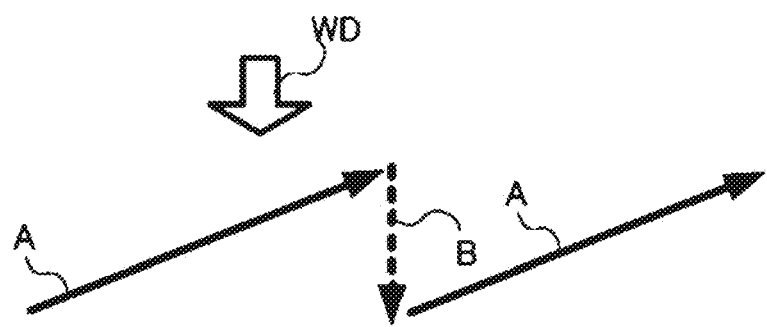
FIG. 13 is a route chart illustrating a movement trajectory of the hull when the hull moves laterally to the natural wind.

As illustrated in FIG. 13, when wind power generation is conducted while the hull 16 as a whole moves laterally to (in a direction orthogonal to) the wind direction of the natural wind WD, in the power generation mode A, the hull 16 moves only in the set advancing direction while moving in the windward direction. In the retraction mode B, the hull 16 is moved in a direction substantially the same as the leeward direction and is also moved to a position in the wind direction from which the hull 16 started navigation in the power generation mode A.

Case of Deteriorating External Environment

In the case of deteriorating external environment, such as worsening weather, the control device 30 performs one or more processes of (1) to (3) below.

(1) The advancing velocity V of the hull 16 is reduced. Specifically, the control device 30 reduces the advancing velocity V of the hull 16 by increasing or decreasing the sail angle αs.
(2) The flight motion of Kite 26 is stopped.
(3) The kite 26 is retracted.

Case of Rapid Change in External Environment

In the case of a rapid change in the external environment, such as a rapid change in the weather, the control device 30 performs one or more processes of (4) to (7) below.

(4) The tension strength of the kite 26 and the tether 24 is maintained by increasing the unwinding speed of the tether 24.
(5) The advancing direction of the hull 16 is changed to the leeward side.
(6) The advancing velocity V of the hull 16 is reduced. Note that (6) is the same process as (1) above.
(7) The flight motion of Kite 26 is stopped. Note that (7) is the same process as (2) above.

Operation and Effect of the Above Embodiment

Next, the effects of the above embodiment will be described.

The aquatic wind power generation system 10 according to the above embodiment alternates between a power generation mode A, in which wind power is generated by the unwinding operation of the tether 24 due to the flight of the kite 26, and a retraction mode B, in which the tether 24 is retracted by the winding operation of the tether 24. In the retraction mode B, control is performed to direct the bow 16A of the hull 16 in the leeward direction. Thus, the bow 16A of the hull 16 faces the leeward direction when the tether 24 is retracted, and hence the relative wind velocity with respect to the kite 26 can be reduced. This allows for a reduction in the energy consumption required for the winding operation of the tether 24, thereby improving the overall power generation efficiency.

In the aquatic wind power generation system 10 according to the above embodiment, when the advancing direction D of the hull 16 is a direction substantially the same as the wind direction of the natural wind, the propulsive force Ps of the hull 16 and the tension T of the tether 24 are aligned in the same direction. The winding speed Vt of the tether 24 is set to be slower than the unwinding speed of the tether 24 in the power generation mode A, as much as possible. The power output Qr required to retract the kite 26 is a value obtained by multiplying the tension T of the tether 24 by the winding speed Vt of the tether 24. Therefore, by aligning the propulsive force Ps of the hull 16 and the tension T of the tether 24 in the same direction, the tension T is used to pull the hull 16, and the tension T can thus be reduced. Accordingly, the power output Qr can be reduced by decreasing the winding speed Vt while reducing the tension T.

In the aquatic wind power generation system 10 according to the above embodiment, when the tether 24 is retracted, the hull 16 advances in the vector direction of the tension T of the kite 26, and hence the relative wind velocity with respect to the kite 26 can be efficiently reduced. This also allows for an efficient reduction in the energy consumption required for the winding operation of the tether 24, thereby efficiently improving the overall power generation efficiency.

In the aquatic wind power generation system 10 according to the above embodiment, when the advancing direction D of the hull 16 is angled with respect to the wind direction of the natural wind, the advancing velocity V of the hull 16 is controlled so that the relative velocity Vw with respect to the hull 16 is orthogonal to the advancing velocity V of the hull 16, thus enabling the relative velocity Vw with respect to the hull 16 to reach the minimum velocity. Therefore, by the relative velocity Vw with respect to the hull 16 reaching the minimum velocity, the relative wind velocity with respect to the kite 26 can be minimized, and the energy consumption required for the winding operation of the tether 24 can also be minimized. Accordingly, it is possible to further improve the overall power generation efficiency.

In the aquatic wind power generation system 10 according to the above embodiment, when wind power is generated by the kite 26, since the bow 16A of the hull 16 faces the windward direction, the hull 16 moves against the natural wind. This allows for an increase in the relative wind velocity with respect to the kite 26, leading to a faster unwinding speed of the tether 24 and thus an increase in power output.

In the aquatic wind power generation system 10 according to the above embodiment, by making the advancing direction D of the hull 16 orthogonal to the wind direction of the natural wind, the advancing direction D of the hull 16 can be set to a direction abeam to the wind, resulting in a faster advancing velocity V of the hull 16. This increases the propulsive force Ps of the hull 16, thereby increasing the lateral force Fb applied to the hull 16 and enabling a reduction in the tension T of the kite 26. Therefore, it is possible to efficiently increase the relative velocity with respect to the kite 26, leading to a faster unwinding speed of the tether 24 and thus an increase in power output.

In the embodiment described above, the sailboat 12 includes one hull 16, but the disclosure is not limited thereto. For example, the sailboat 12 may include a multi-hulled vessel, such as a catamaran or trimaran, with two or more hulls connected in parallel on deck. The lateral force generating portion 40 of the embodiment described above can also be applied to the shape of the multi-hulled vessel.

In the aquatic wind power generation system 10 according to the embodiment described above, in the power generation mode A, the control device 30 controls the rudder angle αr so that the vector direction of the tension T of the kite 26 and the advancing direction D of the hull 16 are substantially orthogonal to each other when viewed from above the hull 16, but the disclosure is not limited thereto. For example, the rudder angle αr may be controlled to fall within a range of approximately ±10° from a direction in which the vector direction of the tension T of the kite 26 and the advancing direction D of the hull 16 are substantially orthogonal to each other when viewed from above the hull 16. However, the range varies depending on the area of the kite 26 and the magnitude of the wind velocity Vwd, and the larger the area of the kite 26 and the higher the wind velocity Vwd, the narrower the above range becomes. In the disclosure, the control device 30 only needs to be able to control the rudder angle αr so that the lateral force Fb can be generated in a direction to cancel the tension T of the kite 26.

In the embodiment described above, the rudder angle αr is controlled in order to change the advancing direction D of the hull 16, but the disclosure is not limited thereto. For example, the advancing direction D of the hull 16 may be changed by controlling the sail angle αs to increase the propulsive force Ps and generate a larger lateral force Fb. The advancing direction D of the hull 16 may be changed by controlling both the rudder angle αr and the sail angle αs.

In the present embodiment, the sailboat 12 equipped with the sail 14 has been described, but the disclosure is not limited thereto, and known means capable of generating the propulsive force Ps may be used instead of the sail 14.

One embodiment of the disclosure has been described above, but the disclosure is not limited to such an embodiment. The disclosure may be used in combination with various modifications as appropriate, and may be implemented in various forms within the scope not departing from the gist of the disclosure.

What is claimed is:

1. An aquatic wind power generation system comprising:
   a hull that navigates on water;
   a power generation system that includes a kite connected to the hull via a tether, and alternates between
   a power generation mode in which wind power is generated by an unwinding operation of the tether due to flight of the kite, and
   a retraction mode in which the tether is retracted by a winding operation of the tether; and
   a controller that performs control:
   (a) during retraction mode: (i) to direct a bow of the hull in a leeward direction in the retraction mode so that a vector direction of tension of the kite matches an advancing direction of the hull when viewed from above the hull, and a sail angle of a sail, which is an angle of attack between the sail and a vector of a composite velocity of a wind velocity of a natural wind and an advancing velocity of the hull, to be 90°, and (b) during power generation mode controls a direction of the bow so that a wind direction of natural wind and an advancing direction of the hull are orthogonal to each other when viewed from above the hull.

* * * * *